No. 897,030.
PATENTED AUG. 25, 1908.
W. STEPHENSON.
THRESHING MACHINE.
APPLICATION FILED FEB. 12, 1907.
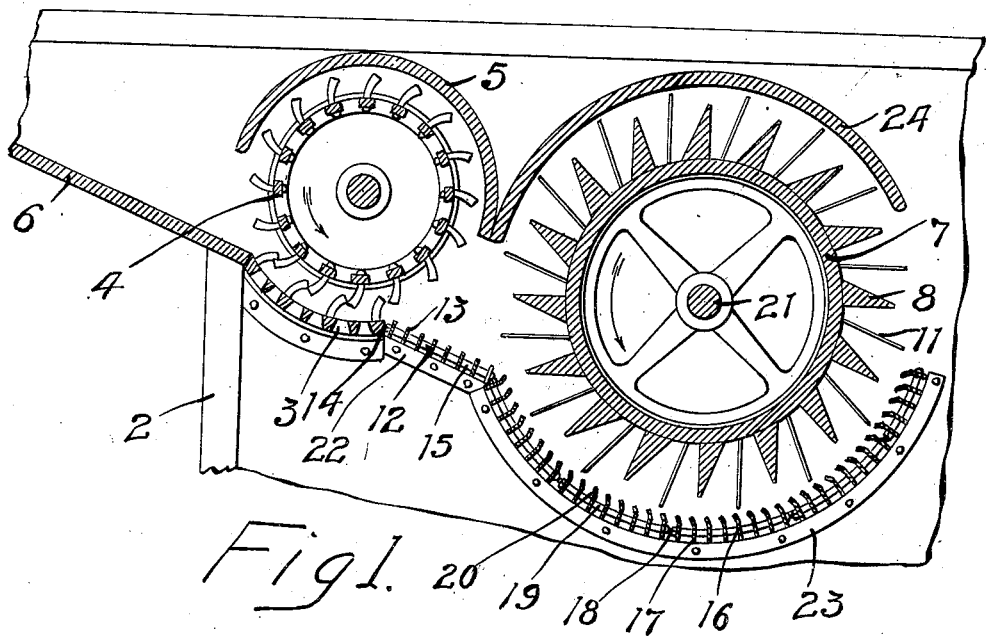
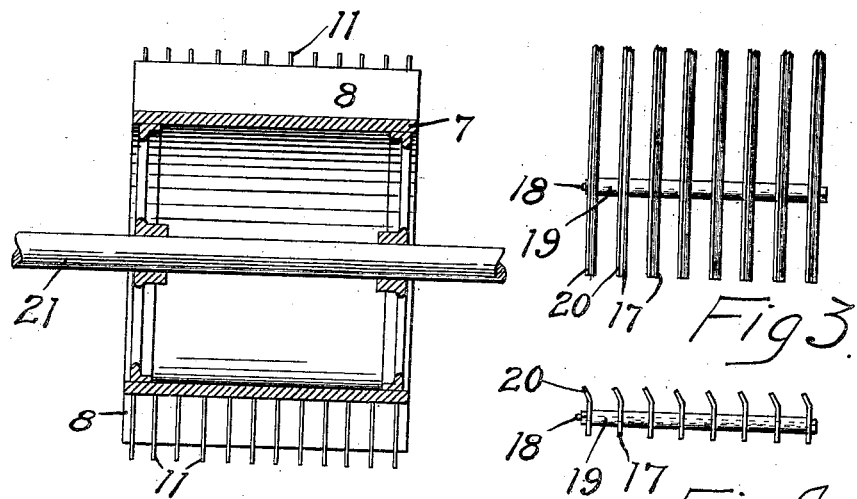
WITNESSES
INVENTOR
WILLIAM STEPHENSON
BY

UNITED STATES PATENT OFFICE.

WILLIAM STEPHENSON, OF HAMILTON, ONTARIO, CANADA.

THRESHING-MACHINE.

No. 897,030.  Specification of Letters Patent.  Patented Aug. 25, 1908.

Application filed February 12, 1907. Serial No. 357,073.

*To all whom it may concern:*

Be it known that I, WILLIAM STEPHENSON, citizen of the Dominion of Canada, residing at Hamilton, county of Wentworth, Province of Ontario, Dominion of Canada, have invented certain new and useful Improvements in Threshing-Machines, of which the following is a specification.

The objects of my invention are:—First.
To provide means for taking away straw, wheat and chaff from a threshing cylinder very quickly and evenly and separating the straw from wheat, chaff and other fine refuse very quickly and thoroughly as it passes from the cylinder, over, to and through the apparatus. Second. To provide a device using air pressure to assist in the separation which will require the material being threshed to travel a much shorter distance than is required by the old method of shaking racks and decks, and which will operate much easier than the devices usually used, and act as a balance wheel, and make the motion of the machine uniform and steady.
Third. To provide an apparatus that will be simple, compact and durable and comparatively inexpensive to install and maintain.

The invention consists generally in a grate arranged in the rear of the threshing cylinder, a drum revolving above said grate and having a series of longitudinally arranged wind boards, and spikes located between said boards and projecting beyond the outer edges thereof, and an overhanging casing for said drum.

Further, the invention consists in various constructions and combinations, all as hereinafter described and particularly pointed out in the claims.

In the accompanying drawings, forming part of this specification, Figure 1 is a vertical sectional view of a portion of a threshing machine with my invention applied thereto. Fig. 2 is a transverse sectional view of the drum. Figs. 3 and 4 are detail views of the grate device.

In the drawings, 2 represents a suitable casing, 3 a cylinder concave, 4 a threshing cylinder of ordinary type and 5 an arched casing located above said cylinder.

6 is a feed board or table over which the grain is fed to the cylinder.

In machines of this kind as generally made, the straw upon passing out on the discharge side of the cylinder is made to travel a considerable distance over shaking racks and grates for the purpose of separating, as far as possible, the loose grain from the straw. This operation, however, is comparatively slow, a considerable portion of the grain being carried out of the machine with the straw and considerable power is required to operate a series of racks and grates, and a large machine is necessary to inclose them.

My invention has for its principal object, the rapid and effective separation of the chaff, grain and fine refuse from the straw just as soon as they emerge on the discharge side of the cylinder. For this purpose I provide a revolving separator cylinder 7 having a series of peripheral wind boards 8 arranged at intervals and extending lengthwise of the periphery of the separator cylinder, and these boards act as fans when the cylinder is revolved, to force currents of air through the grate bars beneath and drive the chaff, fine refuse and grain down through between the said bars. Between the wind boards I provide rows of spikes 11 whose outer ends project beyond the wind boards and are adapted to engage the straw, pull it away from the threshing cylinder and drag it over the grate bars to separate the chaff, fine refuse and grain therefrom and finally discharge it at the rear of the separator cylinder. A grate section 12 is provided at the discharge side of the concave 3, said section consisting of a series of cross bars 13 with rods 14 connecting them, and ferrules 15 of considerable length mounted on said rods between the bars, to hold them the desired distance apart. These bars are preferably flat as indicated in Fig. 1.

On the discharge side of the grate 12 and beneath the separator cylinder is a grate 16 substantially semi-circular in form composed of a series of bars 17 connected by rods 18 and separated by ferrules 19 to correspond with those described, said bars being similar to those of the grate 12 except that their upper edges 20 are turned backwardly toward the threshing cylinder so that the grate will be more effective in catching the grain, fine refuse and chaff and directing it between the bars. The bars are made any desired distance apart and the grate of any suitable size according to the diameter of the separator cylinder. Preferably the grate is made in sections of eight or ten bars in each section. It will be noted that the grate section 12 is flat on top while the section 16 is curved to correspond with the periphery of the drum 7. The separator cylinder may be made of any suitable material and any desired length to suit the width of the threshing machine, and is keyed on a suitable shaft 21 driven from a pulley (not shown). I prefer to construct the apparatus so that the distance from the rear or discharge side of the threshing cylinder to the corresponding side of the separator cylinder, will be approximately thirty-eight inches, as I have found that the separation of the straw from the grain, fine refuse and chaff can be more effectually performed in that distance than in the space of ten or twelve feet required in the ordinary machines having vibrating racks, pans or decks.

The wind boards on the separator cylinder are preferably arranged so that their outer edges will be about one and one-half inches from the grate bars and the ends of the spikes about one-quarter of an inch from the grate bars, and I have found that this construction will produce the best result. I do not, however, confine myself to the exact length of the wind boards and spikes shown, as the same may be varied in different kinds of machines and for handling different kinds of grain.

I have shown the grates supported at the sides of the machine upon suitable cleats or slats 22 and 23 but I do not wish to confine myself to this construction, as various other means for supporting these devices may be employed. An arched casing 24 is provided over the separator cylinder 7 and approximately the same space is provided between this casing and the ends of the spikes as there is between the threshing cylinder hood or casing and its teeth. These arched casings not only form shields for the revolving cylinders, but the one over the separator cylinder aids it in collecting the air, a portion of the current being directed through the flat grate 12, driving the wheat, chaff and fine refuse with it, and a portion of the air passing along over and through the grate under the separator cylinder and carrying away the fine refuse material that is separated from the straw by the action of the separator cylinder. The grain is also separated from the stream of straw by the action of this separator cylinder and passing down through the curved grates is collected in any suitable way beneath, while the now thoroughly threshed and cleaned straw passes on out of the discharge side of the separator cylinder.

I claim as my invention:—

1. The combination, with a threshing cylinder and its concave, of a separating cylinder located on the discharge side of said threshing cylinder and contiguous thereto, a series of windboards or blades mounted on the periphery of said separating cylinder and extending lengthwise thereof from end to end and comparatively near together on the periphery of said separating cylinder, said separating cylinder having convex surfaces between said windboards, a substantially semi-cylindrical grating located below said separating cylinder and composed of a series of transversely arranged bars, the material from said threshing cylinder passing over said grating and said windboards creating strong currents of air through said grating, and an arched casing overhanging said separating cylinder, substantially as described.

2. The combination, with a threshing cylinder and concave, of a revolving separator cylinder provided on the discharge side of said threshing cylinder, a series of windboards mounted on the periphery of said separator cylinder and extending lengthwise from end to end thereof, and spaced apart on said separator cylinder and having sufaces on one side at right angles substantially to the axis of said separator cylinder, and surfaces on the other side inclined or tangential with respect to the surface of said separator cylinder, whereby the material contacting with said inclined surfaces will be deflected and thrown off thereby, a grating located beneath said separator cylinder and through which the grain and fine refuse material is blown by the currents of air from said windboards, substantially as described.

3. The combination, with a threshing cylinder and concave, of a revolving separator cylinder, a series of windboards mounted on the periphery of said separator cylinder, said boards being arranged at intervals and extending lengthwise of said separator cylinder from end to end, a series of spikes arranged in rows, midway substantially between said windboards, the outer ends of said spikes projecting beyond the corresponding edges of said windboards, a grating located beneath said separator cylinder and through which currents of air are established by said windboards, and the grain and fine refuse material blown out from the straw, and the ends of said spikes passing near said grating, whereby the long straw will be drawn therefrom and delivered on the discharge side of said grating.

4. The combination, with a threshing cylinder and concave, of a comparatively large separating cylinder located on the discharge side of said threshing cylinder, a series of windboards provided at intervals on the periphery of said separating cylinder and extending lengthwise thereof from end to end, a downwardly inclined grating forming a continuation of said threshing cylinder concave and a substantially semi-cylindrical grating arranged beneath said separating drum and connected with said downwardly inclined grating, said downwardly inclined grating and said semi-cylindrical grating being composed of transversely arranged bars, the bars of said semi-cylindrical grating having backwardly turned upper edges, said windboards operating to establish currents of air through the bars of said semi-cylindrical grating, and an arched casing overhanging said separator drum.

In witness whereof, I have hereunto set my hand this 4th day of February 1907.

WILLIAM STEPHENSON.

Witnesses:
E. L. REID,
M. J. JEFFREY.